Dec. 24, 1968    R. KINGSLAKE    3,418,039

TRIPLET COVERING A WIDE FIELD

Filed Dec. 27, 1965

| F=100 mm. | | | | f/6.3 |
|---|---|---|---|---|
| ELEMENT | $N_D$ | V | RADII IN mm. | THICKNESS OR SEPARATION IN mm. |
| 1 | 1.611 | 58.8 | $R_1$ = 31.4 | |
| | | | $R_2$ = 585.0 | $T_1$ = 6.33 |
| 2 | 1.605 | 38.0 | $R_3$ = −80.8 | $S_1$ = 5.38 |
| | | | $R_4$ = 33.4 | $T_2$ = 2.32 |
| 3 | 1.611 | 58.8 | $R_5$ = 174.0 | $S_2$ = 8.77 |
| | | | $R_6$ = −53.8 | $T_3$ = 4.04 |

RUDOLF KINGSLAKE
INVENTOR.

BY *F.W. Emerson Kelsey*
*Leonard W. Beadle*
ATTORNEYS

3,418,039
TRIPLET COVERING A WIDE FIELD
Rudolf Kingslake, Rochester, N.Y., assignor to Eastman Kodak Company, Rochester, N.Y., a corporation of New Jersey
Filed Dec. 27, 1965, Ser. No. 516,275
1 Claim. (Cl. 350—226)

This invention relates to photographic objectives. More specifically, this invention relates to photographic objectives of the airspaced triplet type which are capable of covering a very wide field.

The airspaced triplet is one of the simplest and most common forms of achromatized lenses used in photography. With the extensive amount of designing work done on this type of lens, good corrections have been obtained throughout fields of 28° half-angle. In a few cases half-angles of 30° or more have been obtained with fairly good corrections. Most of these attempts to get over 30° with an airspaced triplet have tended to change the design of the lens toward that of a reversed telephoto. In this regard, the middle negative element is placed very close to the front positive element and relatively far from the rear positive element making the first two elements in the nature of a single component. See for example, U.S. 3,087,384, U.S. 2,731,884, U.S. 1,658,365, in which half-angles as large as 32° are claimed.

It is an object of this invention to provide a design for an airspaced triplet using inexpensive glasses which will give good corrections over a field extending to at least 34° half-angle, with less vignetting at that angle than any known prior airspaced triplet.

The above and other objects of this invention are accomplished by reducing the overall length of the lens, by placing the aperture stop inside the lens, and by adjusting the powers and spacings of the three strongest surfaces within limits more specifically set out below, which limits do not tend toward a reversed telephoto design.

Figures 1, 2:
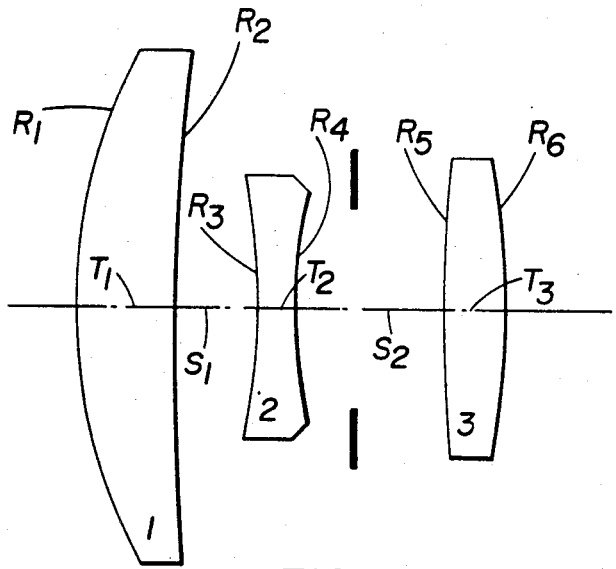
FIG. 1 is a diagrammatic axial cross section of an objective constructed according to the invention.
FIG. 2 is a chart of the specifications for construction of an objective made according to FIG. 1.

In all cases herein, including the drawings, from front to rear, the lens elements are numbered from 1 to 3, the radii from $R_1$ to $R_6$, the thicknesses from $T_1$ to $T_3$ and the separations from $S_1$ to $S_2$. The indexes of refraction, $N_D$ are for the D line of the spectrum, V represents the respective dispersive index, F is the focal length and L is the length of the lens. $f_1$ to $f_6$ are the focal lengths in air, $$R/N-1$$

of the surfaces taken separately. The terms front and rear refer to the long conjugate side and the short conjugate side of the lens respectively.

An objective of the type described can be designed if the focal lengths of surfaces are kept within the following ranges:

$$.40F < f_1 < .55F$$
$$.45F < f_4 < .60F$$
$$.80F < f_6 < 1.05F$$
$$f_4 < 0.5 f_3$$

and if the following spacing relationships are maintained:

$$L < .30F$$
$$.45 < \frac{T_3 + S_2}{L} < .57$$

The above inequalities describe a lens with nearly all the positive power in $R_1$ and $R_6$ with most of it in $R_1$. Most of the negative power is in $R_4$, and $R_4$ is spaced fairly close to midway between $R_1$ and $R_6$. $R_1$, $R_4$ and $R_6$ are relatively weak for an airspaced triplet.

The following example was designed within these ranges:

EXAMPLE 1
F=100 mm.    f/6.3

| Element | $N_D$ | V | Radius in mm. | Thickness or Separation in mm. |
|---|---|---|---|---|
| 1 | $N_1$=1.611 | $V_1$=58.8 | $R_1$=31.4 | $T_1$=6.33 |
|  |  |  | $R_2$=585 | $S_1$=5.38 |
| 2 | $N_2$=1.605 | $V_2$=38.0 | $R_3$=—80.8 | $T_2$=2.32 |
|  |  |  | $R_4$=33.4 | $S_2$=8.77 |
| 3 | $N_3$=1.611 | $V_3$=58.8 | $R_5$=174 | $T_3$=4.04 |
|  |  |  | $R_6$=—53.8 |  |

The aperture stop for the above lens is placed in $S_2$, 3.66 mm. from $R_4$.

To obtain excellent illumination in the corners for this type of lens the clear aperture diameters of each element should exceed the following minima:

$$D_1 > .30F$$
$$D_3 > .15F$$
$$D_6 > .18F$$

where $D_1$, $D_3$ and $D_6$ are the clear aperture diameters of the 1st, 3rd and 6th surfaces respectively.

This example provides an objective with good corrections up to 35° half-angle and vignetting to .30 at that obliquity.

Although no prior art with comparable results is known to the inventors, the results of Example 1 have been improved upon in some respects. Examples 2 and 3 represent an improvement upon this invention which is more clearly set out in a cofiled application Ser. No. 516,459 filed Dec. 27, 1965 in the names of M. D. Ackroyd and W. H. Price.

EXAMPLE 2
F=100 mm.    f/6.3

| Element | $N_D$ | V | Radius in mm. | Thickness or Separation in mm. |
|---|---|---|---|---|
| 1 | 1.611 | 57.2 | $R_1$=26.4 | $T_1$=4.15 |
|  |  |  | $R_2$=585 | $S_1$=4.30 |
| 2 | 1.579 | 41.0 | $R_3$=—81.0 | $T_2$=1.13 |
|  |  |  | $R_4$=27.0 | $S_2$=9.25 |
| 3 | 1.611 | 57.2 | $R_5$=225 | $T_3$=2.95 |
|  |  |  | $R_6$=—54.7 |  |

EXAMPLE 3

F=100 mm.   f/6.3

| Element | $N_D$ | V | Radius in mm. | Thickness or Separation in mm. |
|---|---|---|---|---|
| 1 | 1.611 | 57.2 | $R_1=25.5$ $R_2=1100.$ | $T_1=4.8$ $S_1=3.55$ |
| 2 | 1.605 | 37.9 | $R_3=-81.4$ $R_4=26.4$ | $T_2=1.24$ $S_3=8.81$ |
| 3 | 1.611 | 57.2 | $R_5=206$ $R_6=-55.7$ | $T_3=3.38$ |

Examples 2 and 3 give corrections and field coverage comparable to Example 1 but with a much smaller first element. This advantage cannot be overemphasized in production of an inexpensive camera lens. In Example 2, for example, for vignetting to .59 at 34° half-angle the clear aperture of the first surface $D_1$ need be only .24F, while $D_3$ and $D_6$ are .16F and .23F respectively. For good illumination in the corners it is important that $D_1$ and $D_6$ exceed .20F and $D_3$ exceed .13F.

It should be noted that these objectives give other advantages than those previously mentioned. The glasses used are of medium refraction and of the least expensive type and the lens can be focused by moving the front element only. These attributes plus those mentioned before make these objectives extremely well qualified for use with a simple camera in which a short front-to-rear distance is desired.

Although the invention has been described in considerable detail with reference to certain preferred embodiments thereof, it will be understood that variations and modifications can be effected without departing from the spirit and scope of the invention as described hereinabove and as defined in the appended claim.

I claim:

1. A wide angle photographic objective consisting of two outer positive elements separated by and airspaced from a central negative element in which the radii of curvature R, the separations S, the thicknesses T, the refractive indexes $N_D$, and the dispersive indexes V, each numbered by subscripts from front to rear, conform substantially to the following specifications:

F=100 mm.   f/6.3

| Element | $N_D$ | V | Radius in mm. | Thickness or Separation in mm. |
|---|---|---|---|---|
| 1 | $N_1=1.61$ | $V_1=58.8$ | $R_1=31.4$ $R_2=585$ | $T_1=6.33$ $S_1=5.38$ |
| 2 | $N_2=1.61$ | $V_2=38.0$ | $R_3=-80.8$ $R_4=33.4$ | $T_2=2.32$ $S_2=8.77$ |
| 3 | $N_3=1.61$ | $V_3=58.8$ | $R_5=174$ $R_6=-53.8$ | $T_3=4.04$ |

References Cited

UNITED STATES PATENTS 2,279,372   4/1942   Herzberger.
3,087,384   4/1963   Bauer et al.

DAVID SCHONBERG, *Primary Examiner.*

R. J. STERN, *Assistant Examiner.*

U.S. Cl. X.R.

350—209